(12) United States Patent
Wang et al.

(10) Patent No.: US 12,165,503 B2
(45) Date of Patent: Dec. 10, 2024

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Xuan-Huan Su, Taoyuan (TW); Yu-Chi Kuo, Taoyuan (TW); Yueh-Lin Lee, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 107 days.

(21) Appl. No.: 17/944,441

(22) Filed: Sep. 14, 2022

(65) Prior Publication Data

US 2023/0082845 A1 Mar. 16, 2023

Related U.S. Application Data

(60) Provisional application No. 63/243,879, filed on Sep. 14, 2021.

(51) Int. Cl.
| | |
|---|---|
| G08B 6/00 | (2006.01) |
| G02B 7/04 | (2021.01) |
| H02N 2/00 | (2006.01) |
| H04N 23/51 | (2023.01) |
| H04N 23/54 | (2023.01) |
| H04N 23/55 | (2023.01) |
| H04N 23/57 | (2023.01) |
| H04N 23/60 | (2023.01) |

(52) U.S. Cl.
CPC ............... *G08B 6/00* (2013.01); *G02B 7/04* (2013.01); *H02N 2/001* (2013.01); *H04N 23/51* (2023.01); *H04N 23/54* (2023.01); *H04N 23/55* (2023.01); *H04N 23/57* (2023.01); *H04N 23/60* (2023.01); *G03B 2205/0069* (2013.01)

(58) Field of Classification Search
CPC .. G02B 5/005; G02B 7/04; G03B 2205/0069; G06F 1/1626; G06F 1/1686; G08B 6/00; H02N 2/001; H04N 23/51; H04N 23/54; H04N 23/55; H04N 23/57; H04N 23/60
See application file for complete search history.

(56) References Cited

U.S. PATENT DOCUMENTS

| | | | |
|---|---|---|---|
| 2015/0381859 A1* | 12/2015 | Cover .................... | H04N 23/51 348/374 |
| 2016/0112608 A1* | 4/2016 | Elensi ................... | H04N 23/51 348/143 |
| 2018/0188539 A1* | 7/2018 | Li ........................ | G02B 27/0176 |
| 2019/0215426 A1* | 7/2019 | Ko ....................... | G06F 1/1616 |
| 2020/0280662 A1* | 9/2020 | Gao ..................... | G06F 3/0421 |
| 2021/0176399 A1* | 6/2021 | Byon ................... | H04N 23/685 |
| 2021/0211574 A1* | 7/2021 | Song ................... | H04N 23/667 |
| 2021/0289130 A1* | 9/2021 | Zhong ................. | H04M 1/0264 |
| 2021/0360095 A1* | 11/2021 | Liao ..................... | H04N 23/57 |

(Continued)

*Primary Examiner* — Amy R Hsu

(57) ABSTRACT

An optical element driving mechanism is provided and includes a first movable part, a fixed assembly and a first driving assembly. The first movable part includes an optical element, and the first movable part is movable relative to the fixed assembly. The first driving assembly is configured to drive the first movable part to move relative to the fixed assembly. The fixed assembly includes a first base and a second base arranged along a first axis, and the first movable part moves along the first axis.

19 Claims, 13 Drawing Sheets

(56) References Cited

U.S. PATENT DOCUMENTS

2023/0078421 A1\* 3/2023 Han .................. G01S 17/10
  348/135
2023/0164444 A1\* 5/2023 Yang ................ H04N 23/55
  348/335

\* cited by examiner

OPTICAL ELEMENT DRIVING MECHANISM

CROSS REFERENCE TO RELATED APPLICATIONS

This application claims the benefit of U.S. Provisional Application No. 63/243,879, filed on Sep. 14, 2021, the entirety of which is incorporated by reference herein.

BACKGROUND OF THE DISCLOSURE

Field of the Disclosure

The present disclosure relates to an optical element driving mechanism, and in particular it relates to an optical element driving mechanism with a shutter structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice for consumers.

BRIEF SUMMARY OF THE DISCLOSURE

According to some embodiments of the disclosure, the present disclosure provides an optical element driving mechanism including a first movable part, a fixed assembly and a first driving assembly. The first movable part includes an optical element, and the first movable part is movable relative to the fixed assembly. The first driving assembly is configured to drive the first movable part to move relative to the fixed assembly. The fixed assembly includes a first base and a second base arranged along a first axis, and the first movable part moves along the first axis.

According to some embodiments, the first driving assembly is configured to drive the first movable part relative to the fixed assembly to move between a first position and a second position. The fixed assembly further includes an outer frame, which is fixedly connected to the first base and the second base. The outer frame has a first opening. When the first movable part is located in the second position, the optical element shields the first opening.

According to some embodiments, the optical element driving mechanism further includes a first sensing assembly configured to sense the position of the first movable part relative to the fixed assembly. The first sensing assembly includes a first sensor and a sensed element. The second base has a receiving space, which is concaved from the top surface of the second base along a second axis. The first sensor and the sensed element are accommodated in the receiving space. The first sensor is fixedly disposed at the second base. The sensed element is fixedly disposed on the optical element.

According to some embodiments, when the first movable part is located in the first position and when viewed along the second axis, the sensed element does not overlap the first sensor. When the first movable part is located in the second position and when viewed along the second axis, the sensed element overlaps at least a portion of the first sensor. When the first movable part is located in the second position, a projection of the center of the sensed element along the second axis is located on the first sensor.

According to some embodiments, the first sensor is configured to sense the sensed element to generate a first sensed value to an external circuit. When the first movable part is located in the second position, the first sensing value exceeds a first threshold. When the first sensing value exceeds the first threshold, the external circuit determines that the optical element shields the first opening according to the first sensing value.

According to some embodiments, the optical element driving mechanism further includes a second sensing assembly configured to sense the position of the first movable part relative to the fixed assembly. The second sensing assembly includes a second sensor. The second sensor is accommodated in the receiving space. The second sensor is fixedly disposed at the second base. When the first movable part is located in the first position and when viewed along the second axis, the sensed element overlaps the second sensor. When the first movable part is located in the first position, the projection of the center of the sensed element along the second axis is located outside the second sensor. When the first movable part is located in the second position and when viewed along the second axis, the sensed element does not overlap the second sensor.

According to some embodiments, the second sensor is configured to sense the sensed element to generate a second sensed value to the external circuit. When the first movable part is located in the first position, the second sensing value exceeds a second threshold. When the second sensing value exceeds the second threshold, the external circuit determines that the optical element does not shield the first opening according to the second sensing value. The second threshold is lower than the first threshold.

According to some embodiments, the optical element driving mechanism further includes a second driving assembly and a second movable part. The second driving assembly is configured to drive the second movable part to rotate around the second axis, thereby locking the first movable part in the first position or the second position. The first driving assembly includes a plurality of first electrical members configured to be electrically connected to the external circuit. The first electrical members are fixedly disposed at the first base, and a portion of each first electrical member is buried in the first base. The second driving assembly includes a plurality of second electrical members configured to be electrically connected to the external circuit. The second electrical members are fixedly disposed at the first base, and a portion of each second electrical member is buried in the first base.

According to some embodiments, the first sensing assembly further includes a plurality of third electrical members configured so that the first sensor is electrically connected to the external circuit. The third electrical members are fixedly disposed at the second base, and a portion of each third electrical member is buried in the second base. The second sensing assembly further includes a plurality of fourth electrical members configured so that the second sensor is electrically connected to the external circuit. The fourth electrical members are fixedly disposed at the second base, and a portion of each fourth electrical member is buried in the second base.

According to some embodiments, each first electrical member has a first electrical connecting portion exposed from the first base. Each second electrical member has a second electrical connecting portion exposed from the first base. Each third electrical member has a third electrical connecting portion exposed from the second base. Each fourth electrical member has a fourth electrical connecting portion exposed from the second base. The third electrical connecting portions and the fourth electrical connecting portions are located on opposite sides of the second base. The first electrical connecting portions, the second electrical connecting portions and the third electrical connecting portions are located on a first side of the optical element driving mechanism.

According to some embodiments, the optical element driving mechanism further includes a stopping assembly configured to limit range of motion of the first movable part relative to the first base. The stopping assembly includes a first buffering element disposed in a first rear groove of the first base. When the first movable part is located in the first position, a holder of the first movable part is in contact with the first buffering element. The first buffering element is made of sponge, soft plastic, silicone, or a combination thereof.

According to some embodiments, the stopping assembly further includes a second buffering element, disposed in an accommodation space of the first base. When the first movable part is located in the second position, the holder of the first movable part is in contact with the second buffering element. The second buffering element is made of sponge, soft plastic, silicone, or a combination thereof. When viewed along the second axis, the holder of the first movable part is located between the second buffering element and the first buffering element.

According to some embodiments, when the first movable part is located in the second position, a front end portion of the holder and a front side wall of the second base form a first distance in the first axis. The front end portion of the holder and a front side surface of the sensed element form a second distance in the first axis. The first distance is longer than the second distance.

According to some embodiments, the stopping assembly further includes two stopping structures, which protrude from the top surface of the second base along the second axis. When the first movable part is located in the second position, the two stopping structures are configured to stop the first movable part. When the first movable part is in the second position, the sensed element is not in contact with the front side wall of the second base.

According to some embodiments, the first base and the second base are made of different materials. The first base and the second base have different Young's moduli. The Young's modulus of the second base is less than the Young's modulus of the first base. The first base has a first bottom surface, and the second base has a second bottom surface. The first bottom surface and the second bottom surface are on the same plane.

According to some embodiments, the second base has two positioning structures, a supporting structure and a side wall. The two positioning structures and the supporting structure protrude from the side wall along a third axis. The third axis is perpendicular to the first axis and the second axis.

According to some embodiments, the outer frame has an engagement portion configured so that the outer frame is connected to the second base. The engagement portion is fixed between the two positioning structures. The engagement portion is in contact with the supporting structure. The engagement portion and the supporting structure cooperatively form a glue trough configured to accommodate an adhesive element. The adhesive element is configured to adhere to the engagement portion and the supporting structure.

According to some embodiments, the outer frame further includes a second opening, and the second opening and the first opening are arranged along the first axis. A third opening corresponding to the first opening is formed on the optical element. When the first movable part is in the first position and when viewed along the second axis, the third opening overlaps the first opening. When the first movable part is located in the first position and when viewed along the second axis, the second opening does not overlap the optical element. The second base further has a supporting portion configured to support the optical element. The supporting portion includes a metal member configured to be in contact with the optical element.

According to some embodiments, the optical element driving mechanism further includes a first optical module and a second optical module. The first optical module, the second base and the second optical module are arranged along the first axis in sequence. The first optical module and the second optical module correspond to the first opening and the second opening respectively.

According to some embodiments, when viewed along the second axis, the first opening overlaps the first optical module, and the second opening overlaps the second optical module. The second base is located between the first optical module and the second optical module. When viewed along the second axis, the second base overlaps a portion of the first optical module. When viewed along the second axis, the second base overlaps a portion of the second optical module. The first driving assembly and the second driving assembly are arranged along the first axis.

The present disclosure provides an optical element driving mechanism, including a first movable part, a fixed assembly, and a first driving assembly. The first movable part includes an optical element, and the first movable part is movable relative to the fixed assembly. The first driving assembly is configured to drive the first movable part to move relative to the fixed assembly. The optical element driving mechanism further includes at least one sensing assembly configured to sense the position of the first movable part relative to the fixed assembly.

In addition, the first base and the second base are arranged along the first axis, and the outer frame has a long strip-shaped structure extending along the first axis. The outer frame is fixedly connected to the first base and the second base, and the second base is configured to support the front end portion of the outer frame. Therefore, when the optical element driving mechanism is subjected to an external force along the second axis, the external force can be dispersed to the second base, thereby preventing the outer frame from being crushed.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
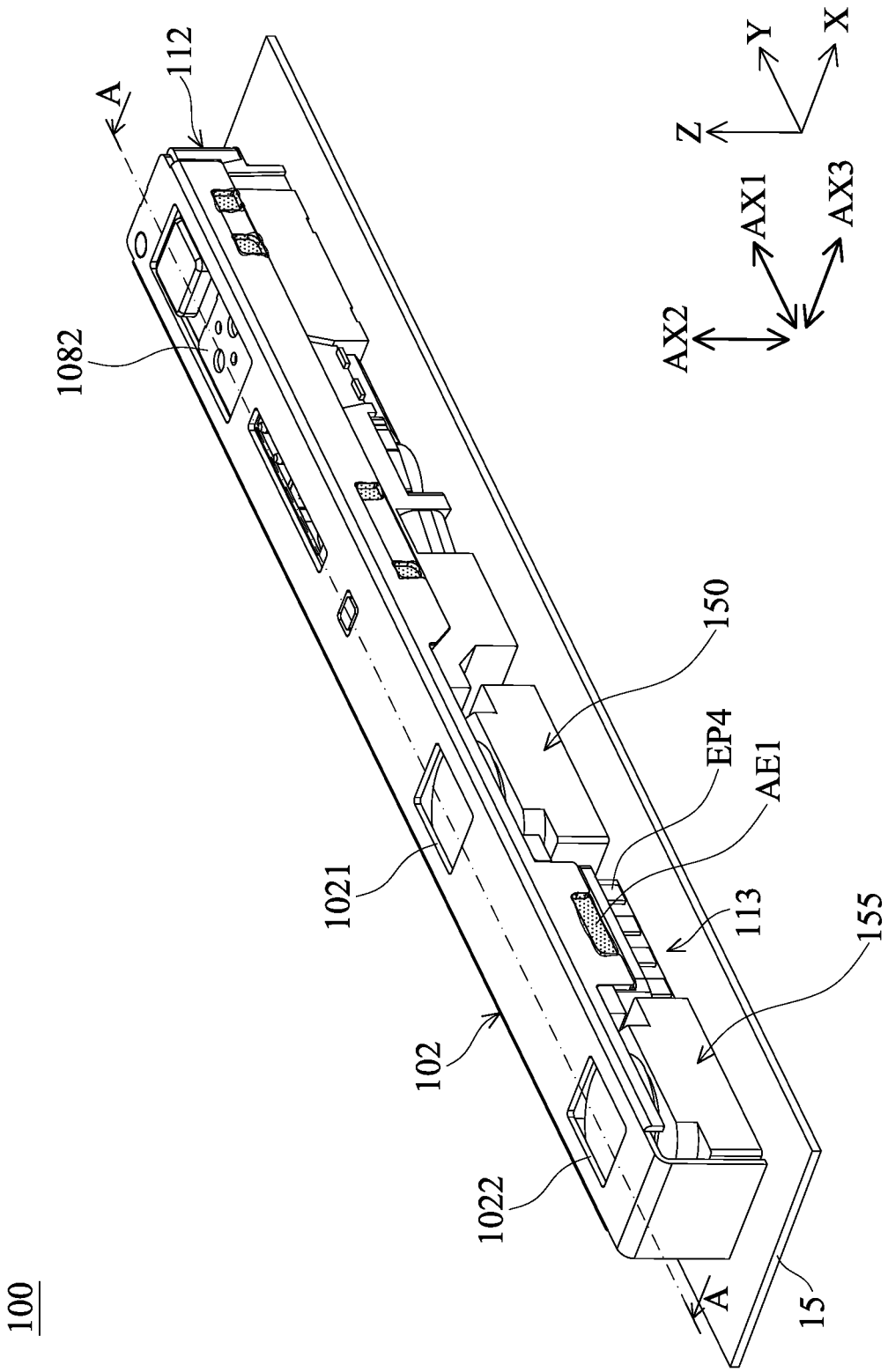
FIG. 1 is a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
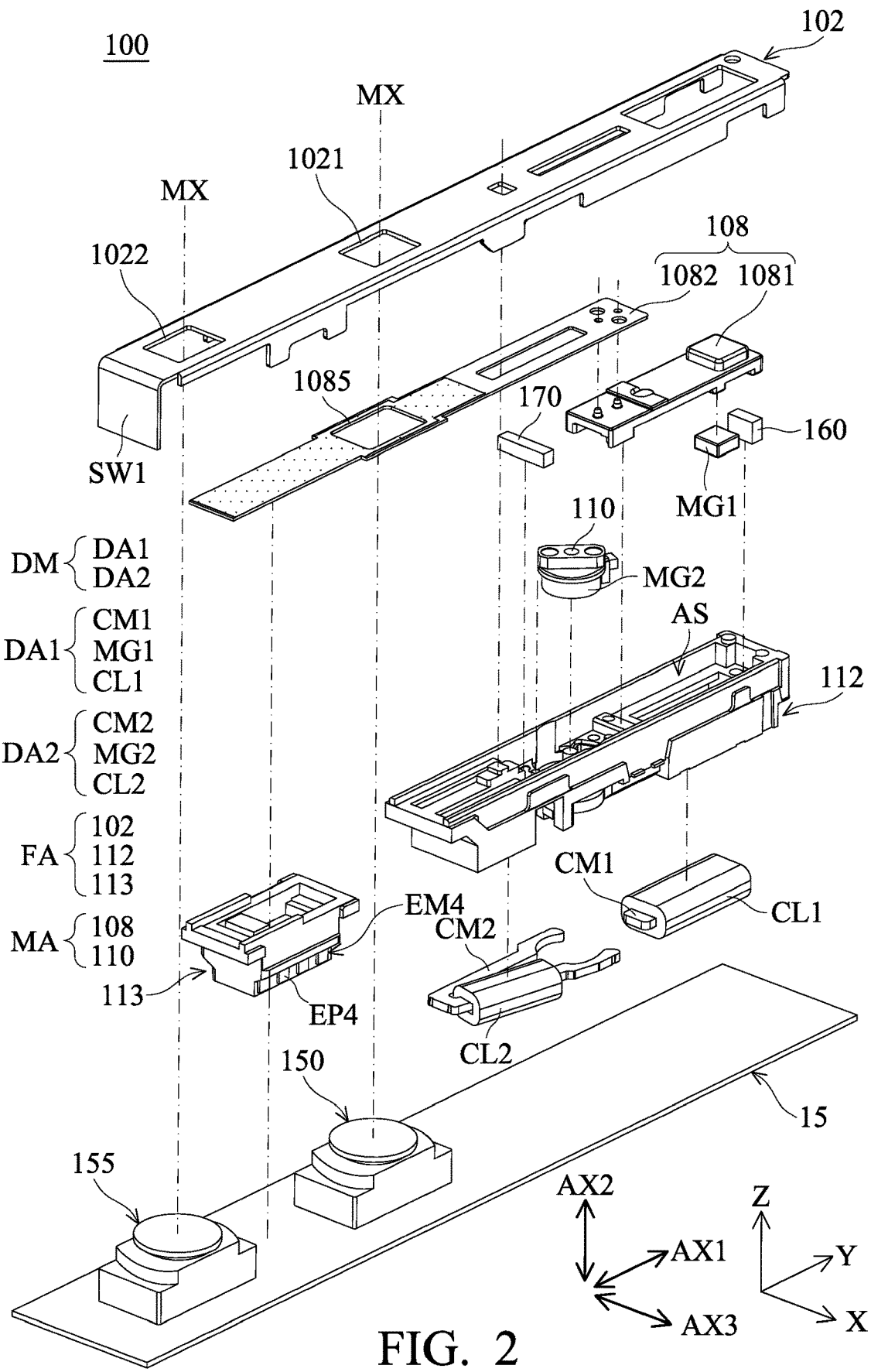
FIG. 2 is an exploded diagram of the optical element driving mechanism 100 according to the embodiment of the present disclosure.

Please refer to FIG. 1 and FIG. 2. FIG. 1 is a schematic diagram of an optical element driving mechanism 100 according to an embodiment of the present disclosure, and FIG. 2 is an exploded diagram of the optical element driving mechanism 100 according to the embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving module DM. The movable assembly MA is movably connected to the fixed assembly FA. The driving module DM is configured to drive the movable assembly MA to move relative to the fixed assembly FA.

In this embodiment, as shown in FIG. 2, the fixed assembly FA includes an outer frame 102, and a first base 112 and a second base 113. The movable assembly MA may include a first movable part 108, and a second movable part 110. The first movable part 108 may include a holder 1081 and an optical element 1082. In this embodiment, the optical element 1082 can be used as a light-shielding film or a shutter, but it is not limited thereto. In other embodiments, the optical element 1082 can also be used as a filter or aperture, and so on.

In this embodiment, the holder 1081 is detachably connected to the optical element 1082, but it is not limited thereto. For example, in other embodiments, the optical element 1082 can be connected to the holder 1081 by insert molding technology. For example, the holder 1081 may be made of a non-metal material, such as a plastic material, and the optical element 1082 may be made of a metal material.

The outer frame 102 is fixedly connected to the first base 112 and the second base 113, the outer frame 102 can be combined with the base 112 to cooperatively accommodate the movable assembly MA and the driving module DM, and the first movable part 108 is movable relative to the fixed assembly FA.

As shown in FIG. 2, the aforementioned outer frame 102 has a first opening 1021 and a second opening 1022, and the second opening 1022 and the first opening 1021 are arranged along a first axis AX1. An first optical module 150 (for example, a photosensitive module) and a second optical module 155 are disposed beside the first base 112 and the second base 113.

The first opening 1021 is configured to allow an external light traveling along a main axis MX to pass and to be received by the aforementioned first optical module 150 so as to generate a digital image signal. Similarly, the second opening 1022 is configured to allow another external light traveling along the main axis MX to pass and to be received by the aforementioned second optical module 155 so as to generate another digital image signal.

As shown in FIG. 2, the optical element driving mechanism 100 is disposed on a first supporting portion 15. The first supporting portion 15 is, for example, a main circuit board in an electronic device, but it is not limited thereto. The optical element driving mechanism 100 is electrically connected to the first supporting portion 15.

Figure 3:
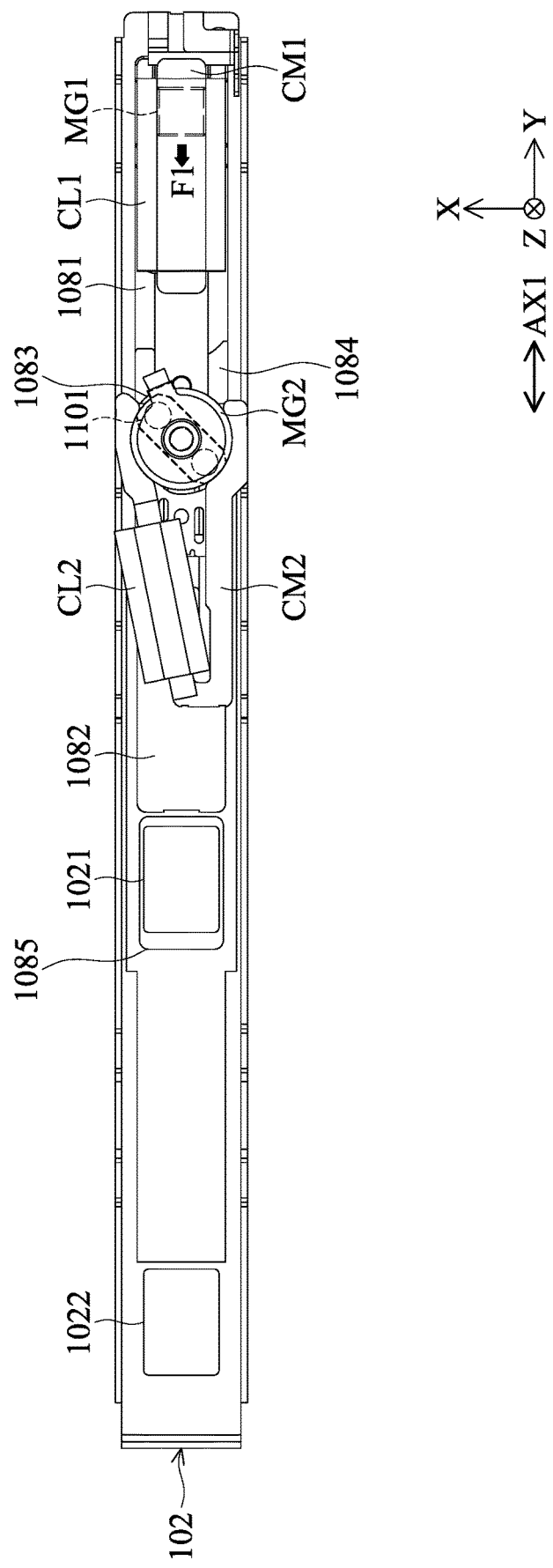
FIG. 3 is a bottom view of a partial structure of the optical element driving mechanism 100 according to an embodiment of the present disclosure.
Figure 4:
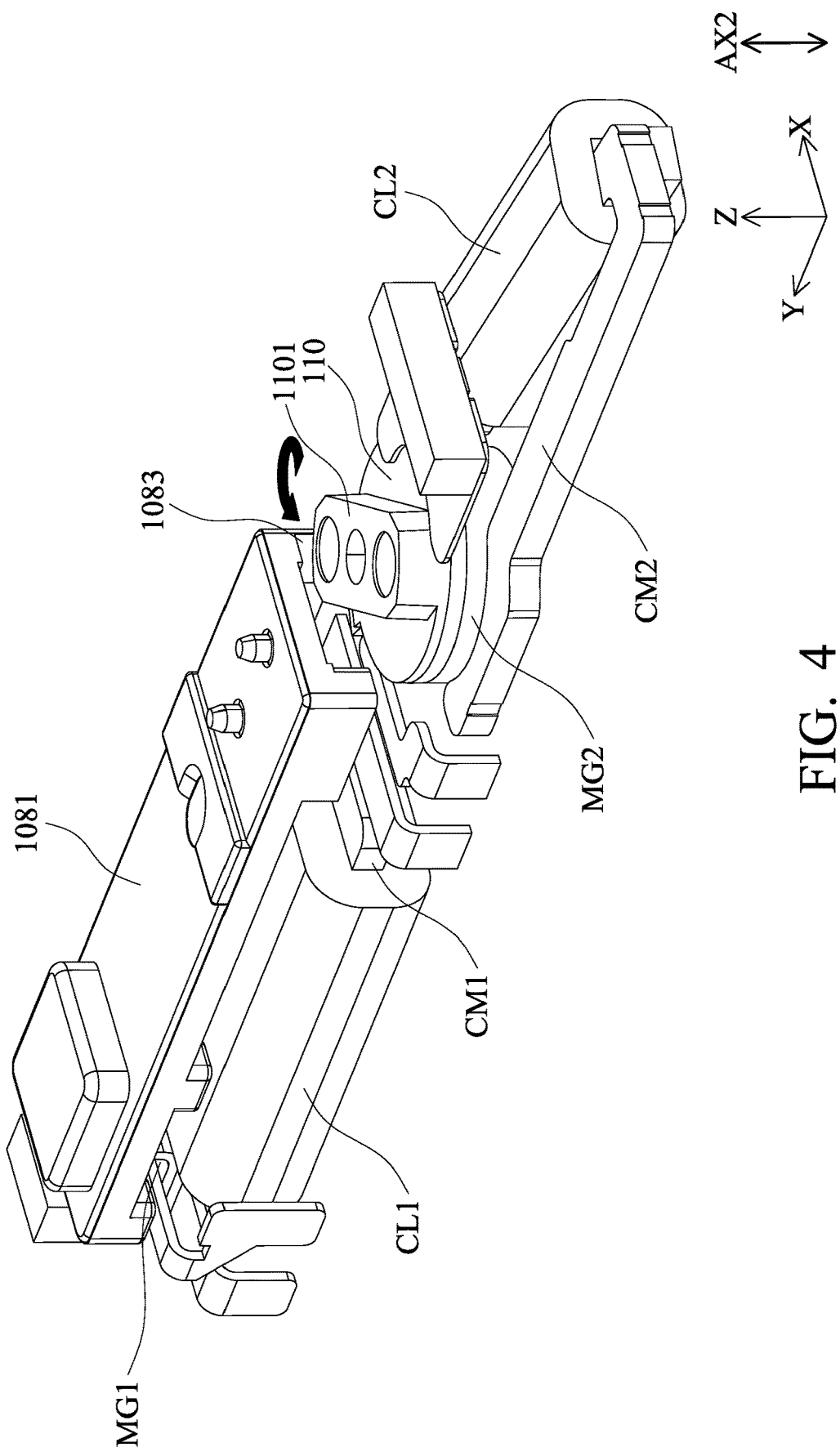
FIG. 4 is a perspective view of a partial structure of the optical element driving mechanism 100 according to an embodiment of the present disclosure.
Figure 5:
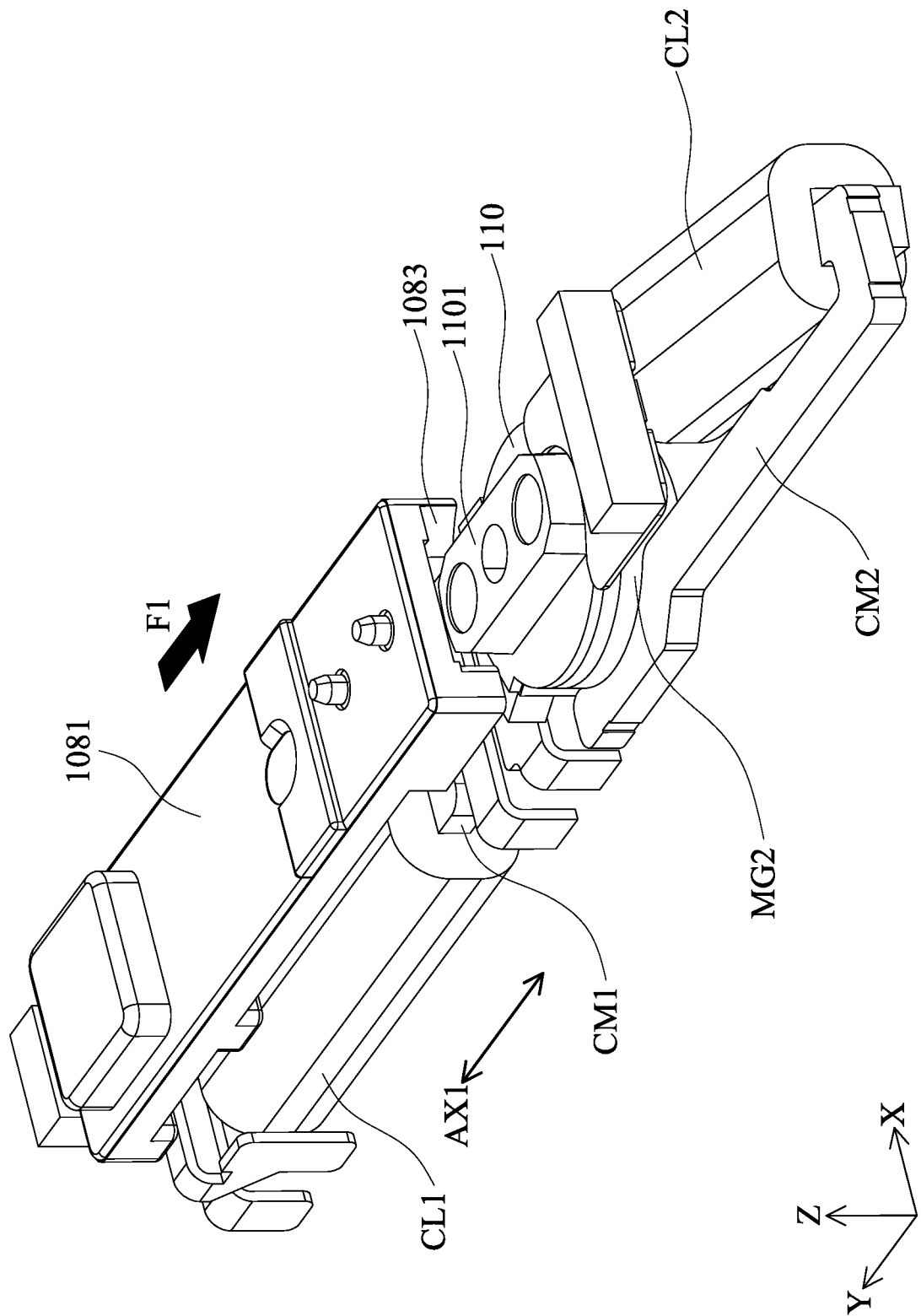
FIG. 5 is a perspective view of the second movable part 110 after rotation according to an embodiment of the present disclosure.
Figure 6:
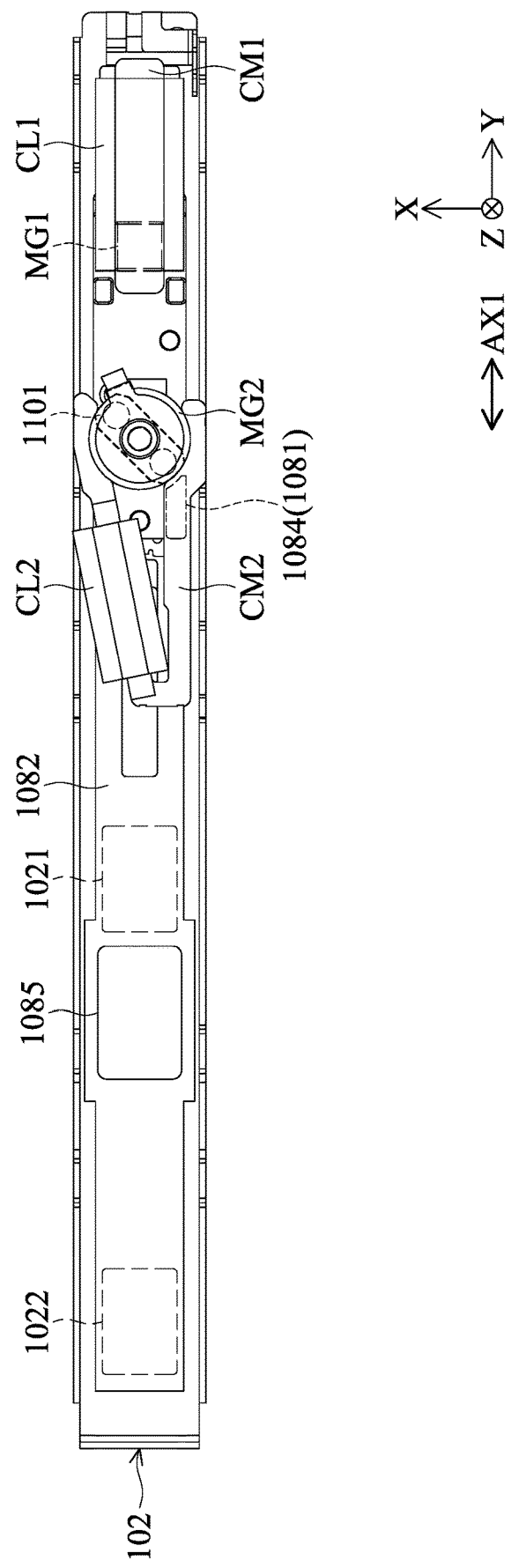
FIG. 6 is a bottom view illustrating that the optical element 1082 covers the first opening 1021 and the second opening 1022 according to an embodiment of the present disclosure.

Please refer to FIG. 1 to FIG. 6. FIG. 3 is a bottom view of a partial structure of the optical element driving mechanism 100 according to an embodiment of the present disclosure, FIG. 4 is a perspective view of a partial structure of the optical element driving mechanism 100 according to an embodiment of the present disclosure, FIG. 5 is a perspective view of the second movable part 110 after rotation according to an embodiment of the present disclosure, and FIG. 6 is a bottom view illustrating that the optical element 1082 covers the first opening 1021 and the second opening 1022 according to an embodiment of the present disclosure.

In this embodiment, the driving module DM may include a first driving assembly DA1 configured to drive the first movable part 108 to move relative to the fixed assembly FA along a first axis AX1 (the Y-axis), so that the optical element 1082 can selectively overlaps the first opening 1021 and the second opening 1022. The driving module DM may further include a second driving assembly DA2, and the second driving assembly DA2 is configured to drive the second movable part 110 to rotate around a second axis AX2 (the Z-axis) relative to the fixed assembly FA.

The first driving assembly DA1 includes a first coil CL1, a first magnetically conductive element CM1 and a first magnetic element MG1. The first magnetic element MG1 corresponds to the first coil CL1 and is fixed on the bottom of the holder 1081. The first magnetically conductive element CM1 corresponds to the first coil CL1. For example, the first coil CL1 surrounds the first magnetically conductive element CM1. The first magnetically conductive element CM1 has a magnetically conductive material and has a long strip-shaped structure.

The second driving assembly DA2 includes a second coil CL2, a second magnetic element MG2 and a second magnetically conductive element CM2. The second magnetic element MG2 corresponds to the second coil CL2 and is fixed on the second movable part 110. The second magnetically conductive element CM2 corresponds to the second coil CL2. For example, the second coil CL2 surrounds the second magnetically conductive element CM2. The second magnetically conductive element CM2 has a magnetically conductive material and has a clamp-shaped structure, and the second magnetically conductive element CM2 is fixedly disposed in an accommodation space AS of the first base 112.

As shown in FIG. 1 and FIG. 3, when viewed along the second axis AX2, and when the first movable part 108 is located in the first position in FIG. 3, the optical element 1082 does not overlap at least a part of the second opening 1022. At the same time, a third opening 1085 corresponding to the first opening 1021 is formed on the optical element 1082, so that the optical element 1082 does not overlap at least a part of the first opening 1021. Furthermore, as shown in FIG. 4, when the second driving assembly DA2 is not operating, a blocking portion 1101 of the second movable part 110 is in contact with a side stopping portion 1083 of the holder 1081 so that the first movable part 108 is stably located in the first position.

When it is desired to drive the optical element 1082 to cover the first opening 1021 and the second opening 1022, the second coil CL2 is energized to act with the second magnetic element MG2 to generate an electromagnetic driving force, so as to drive the second movable part 110 to rotate around the second axis AX2 from the position in FIG. 4 to the position in FIG. 5. As shown in FIG. 5, the extending direction of the blocking portion 1101 is parallel to the first axis AX1, and the blocking portion 1101 does not contact the holder 1081.

Next, the first coil CL1 is energized to act with the first magnetic element MG1 to generate an electromagnetic driving force F1 to drive the first movable part 108 to move along the first axis AX1 from the first position in FIG. 3 to the second position in FIG. 6. At this time, the second driving assembly DA2 can drive the second movable part 110 to rotate around the second axis AX2 again, so that the extending direction of the blocking portion 1101 is not parallel to the first axis AX1, and then the blocking portion 1101 is in contact with the other side stopping portion 1084 of the holder 1081 so that the first movable part 108 is stably located in the second position. Based on the design of the second driving assembly DA2 and the second movable part 110, the first movable part 108 can be stably locked in the first position or the second position.

As shown in FIG. 6, when viewed along the second axis AX2, and when the first movable part 108 is located in the second position in the FIG. 6, the optical element 1082 overlaps the first opening 1021 and the second opening 1022 to avoid the light entering the first optical module 150 and the second optical module 155.

Figure 7:
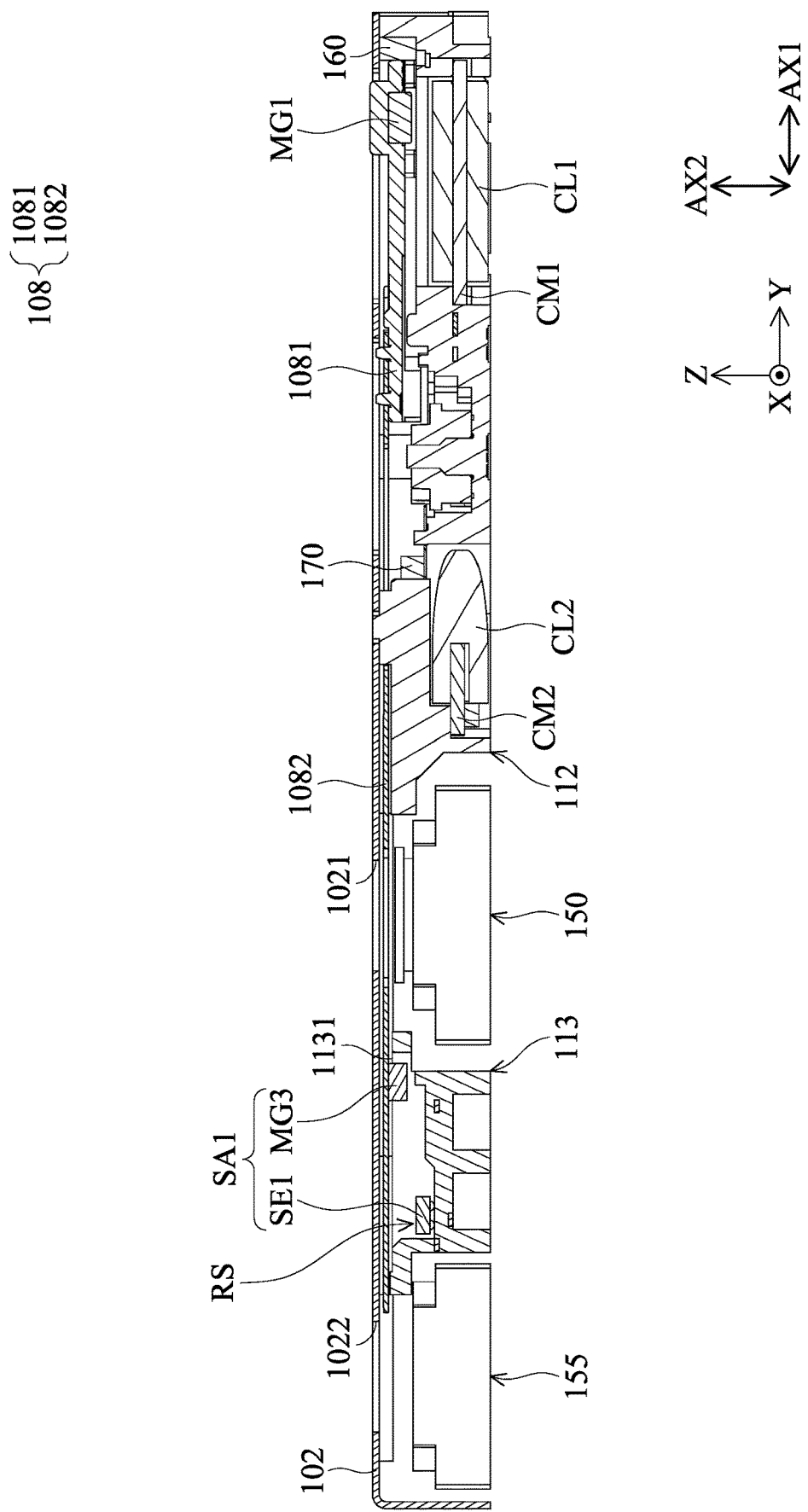
FIG. 7 and FIG. 8 are cross-sectional views of the optical element driving mechanism 100 along line A-A in FIG. 1 according to an embodiment of the present disclosure.
Figure 8:
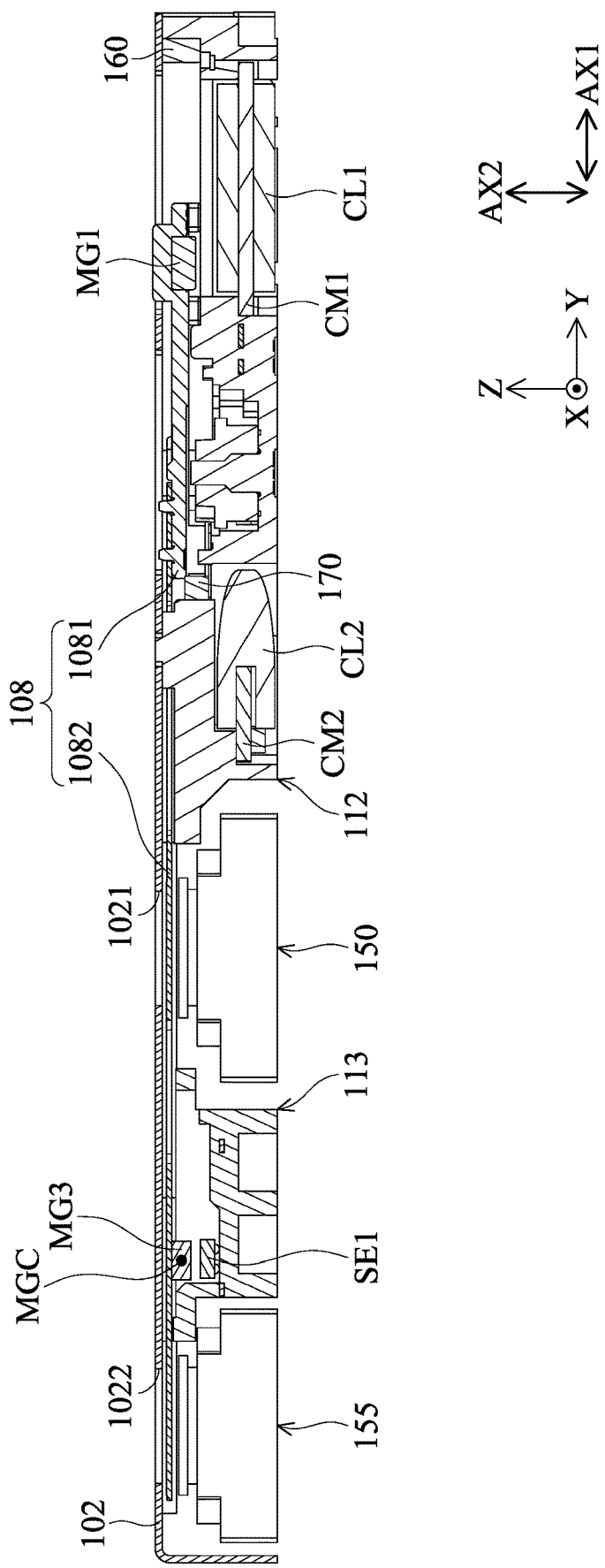

Next, please refer to FIG. 7 and FIG. 8, which are cross-sectional views of the optical element driving mechanism 100 along line A-A in FIG. 1 according to an embodiment of the present disclosure. As shown in figures, the first base 112 and the second base 113 are arranged along the first axis AX1, and the first movable part 108 moves along the first axis AX1.

In this embodiment, the first driving assembly DA1 is configured to drive the first movable part 108 to move between the first position and the second position relative to the fixed assembly FA. As shown in FIG. 7, when the first movable part 108 is located in the first position, the optical element 1082 does not shield the first opening 1021 and the second opening 1022. On the other hand, as shown in FIG. 8, when the first movable part 108 is located in the second position, the optical element 1082 shields the first opening 1021 and the second opening 1022.

The optical element driving mechanism 100 further includes a first sensing assembly SA1 configured to sense the position of the first movable part 108 relative to the fixed assembly FA. The first sensing assembly SA1 includes a first sensor SE1 and a sensed element MG3.

The second base 113 has a receiving space RS, which is concaved from a top surface 1131 of the second base 113 along the second axis AX2. The first sensor SE1 and the sensed element MG3 are accommodated in the receiving space RS. In this embodiment, the first sensor SE1 is fixedly disposed at the second base 113, and the sensed element MG3 is fixedly disposed on the bottom of the optical element 1082.

As shown in FIG. 7, when the first movable part 108 is located in the first position and when viewed along the second axis AX2, the sensed element MG3 does not overlap the first sensor SE1.

On the other hand, as shown in FIG. 8, when the first movable part 108 is located in the second position and when viewed along the second axis AX2, the sensed element MG3 overlaps at least a portion of the first sensor SE1. It is worth noting that when the first movable part 108 is located in the second position, the projection of the center MGC of the sensed element MG3 along the second axis AX2 is located on the first sensor SE1.

The first sensor SE1 is configured to sense the sensed element MG3 to generate a first sensed value to an external circuit. For example, the first sensor SE1 may be, for example, a Hall sensor, and the sensed element MG3 may be, for example, a Hall magnet, but they are not limited thereto.

The first sensor SE1 senses the change of the magnetic field of the sensed element MG3 to obtain the first sensed value, and outputs the first sensed value to the external circuit. The external circuit is disposed on the aforementioned first supporting portion 15 (such as the main circuit board).

The external circuit may have a control unit (not shown) preset with a look-up table, which stores a first threshold in advance. When the first movable part 108 is located in the second position, the first sensed value exceeds the first threshold. When the first sensing value exceeds the first threshold, the control unit of the external circuit determines that the optical element 1082 is located in the second position and shields the first opening 1021 and the second opening 1022 according to the first sensed value.

Figure 9:
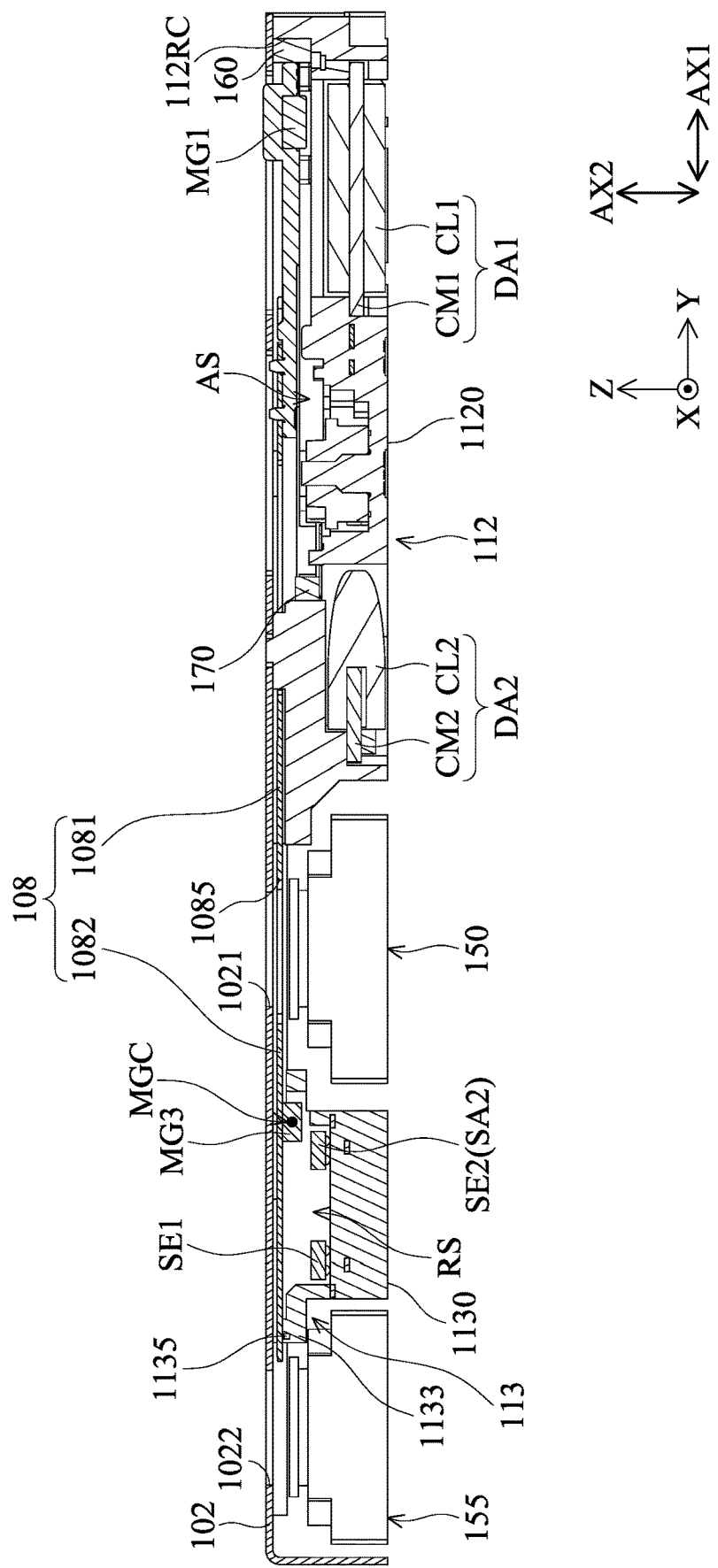
FIG. 9 and FIG. 10 are cross-sectional views of the optical element driving mechanism 100 along line A-A in FIG. 1 according to another embodiment of the present disclosure.
Figure 10:
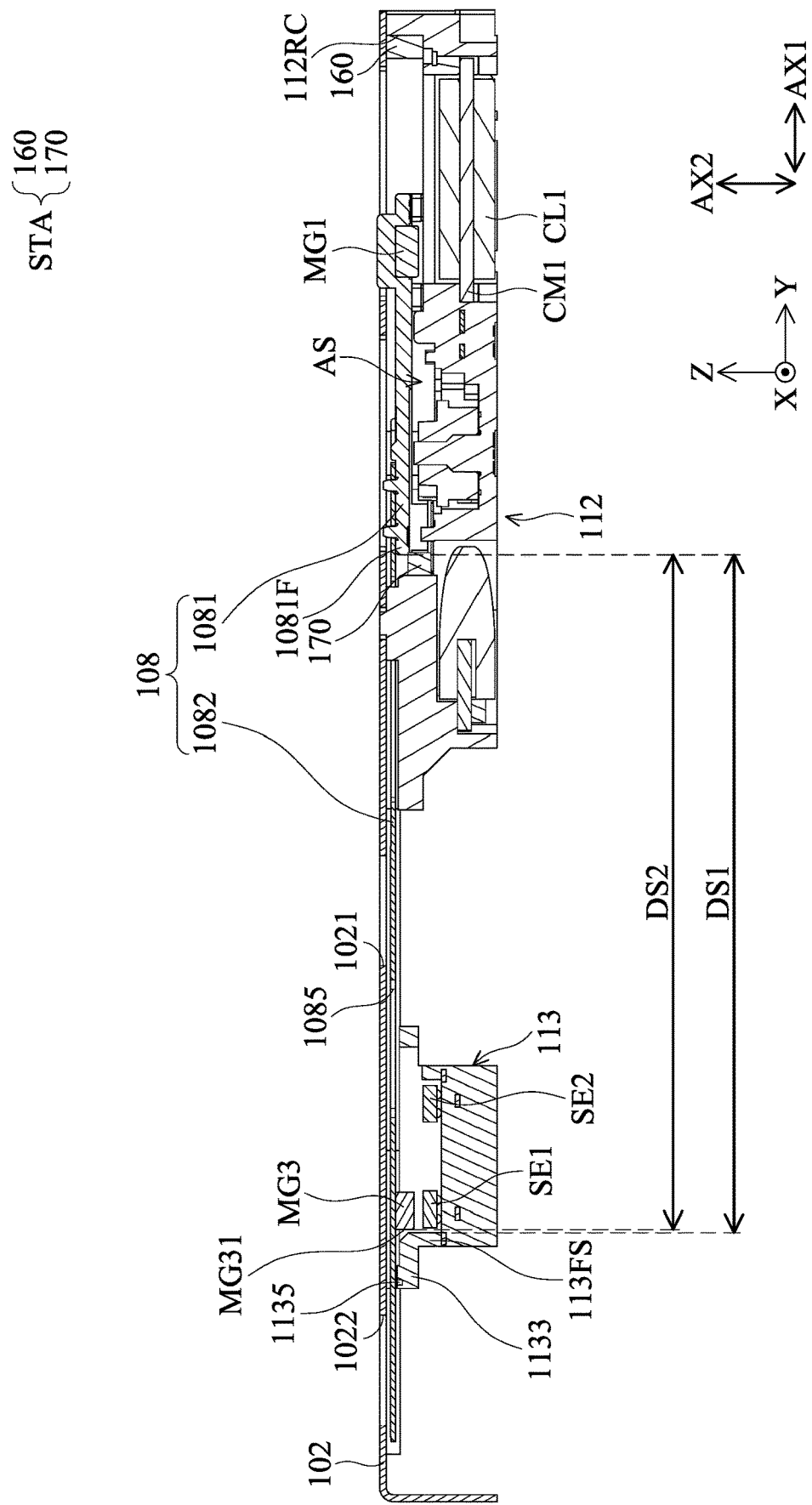

Next, please refer to FIG. 9 and FIG. 10, which are cross-sectional views of the optical element driving mechanism 100 along line A-A in FIG. 1 according to another embodiment of the present disclosure. The elements and structures of this embodiment are similar to those of the previous embodiment, and their difference is that the optical element driving mechanism 100 in this embodiment further includes a second sensing assembly SA2 configured to sense the position of the first movable part 108 relative to the fixed assembly FA.

The second sensing assembly SA2 may include a second sensor SE2, and the second sensor SE2 is accommodated in the receiving space RS. Similarly, the second sensor SE2 is fixedly disposed on the second base 113.

As shown in FIG. 9, when the first movable part 108 is located in the first position and when viewed along the second axis AX2, the sensed element MG3 overlaps the second sensor SE2. It is worth noting that when the first movable part 108 is located in the first position, the projection of the center MGC of the sensed element MG3 along the second axis AX2 is located outside the second sensor SE2.

As shown in FIG. 10, when the first movable part 108 is located in the second position and when viewed along the second axis AX2, the sensed element MG3 does not overlap the second sensor SE2.

The second sensor SE2 is configured to sense the sensed element MG3 to generate a second sensed value to the external circuit. Similarly, the second sensor SE2 can be, for example, a Hall sensor. The second sensor SE2 senses the change of the magnetic field of the sensed element MG3 to obtain a second sensed value, and outputs the second sensed value to the aforementioned external circuit.

In this embodiment, the look-up table also pre-stores the second threshold. When the first movable part 108 is located in the first position, the second sensed value exceeds the second threshold. When the second sensing value exceeds the second threshold, the external circuit determines that the optical element 1082 is located in the first position and does not shield the first opening 1021 and the second opening 1022 according to the second sensed value. It should be noted that the second threshold is lower than the first threshold.

Figure 11:
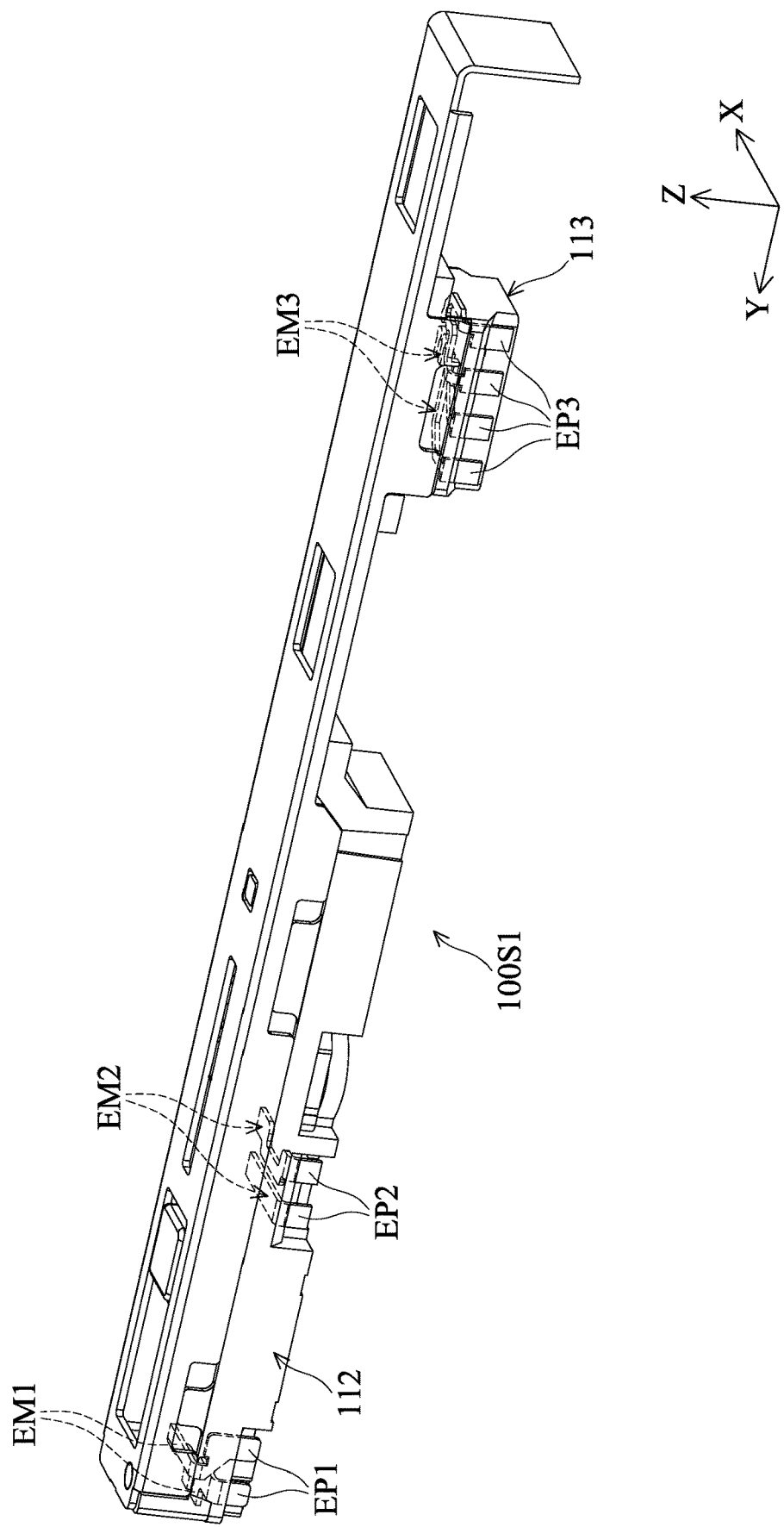
FIG. 11 is a perspective view of the optical element driving mechanism 100 in another view according to an embodiment of the present disclosure.

Please refer to FIG. 1, FIG. 2 and FIG. 11. FIG. 11 is a perspective view of the optical element driving mechanism 100 in another view according to an embodiment of the present disclosure. The first driving assembly DA1 may include a plurality of first electrical members EM1 configured to be electrically connected to the external circuit (the first supporting portion 15). The first electrical members EM1 are fixedly disposed at the first base 112, and a portion of each first electrical member EM1 is buried in the first base 112.

Similarly, the second driving assembly DA2 may include a plurality of second electrical members EM2 configured to be electrically connected to external circuits. The second electrical members EM2 are fixedly disposed at the first base 112, and a portion of each second electrical member EM2 is buried in the first base 112.

Furthermore, the first sensing assembly SA1 further includes a plurality of third electrical members EM3 configured so that the first sensor SE1 is electrically connected to the external circuit. The third electrical members EM3 are fixedly disposed at the second base 113, and a portion of each third electrical member EM3 is buried in the second base 113.

Similarly, as shown in FIG. 2, the second sensing assembly SA2 further includes a plurality of fourth electrical members EM4 configured so that the second sensor SE2 is electrically connected to the external circuit. These fourth electrical members EM4 are fixedly disposed at the second base 113, and a portion of each fourth electrical member EM4 is buried in the second base 113.

Each of the first electrical members EM1 has a first electrical connecting portion EP1 exposed from the first base 112. Each second electrical member EM2 has a second electrical connecting portion EP2 exposed from the first base 112.

Each third electrical member EM3 has a third electrical connecting portion EP3 exposed from the second base 113. Each fourth electrical member EM4 has a fourth electrical connecting portion EP4 exposed from the second base 113. The first electrical connecting portion EP1 to the fourth electrical connecting portion EP4 can be electrical pins, and are configured to be electrically connected to the external circuit by soldering.

In this embodiment, the third electrical connecting portions EP3 and the fourth electrical connecting portions EP4 are located on opposite sides of the second base 113.

Furthermore, as shown in FIG. 11, the first electrical connecting portions EP1, the second electrical connecting portions EP2, and the third electrical connecting portions EP3 are located on a first side 100S1 of the optical element driving mechanism 100.

Figure 12:
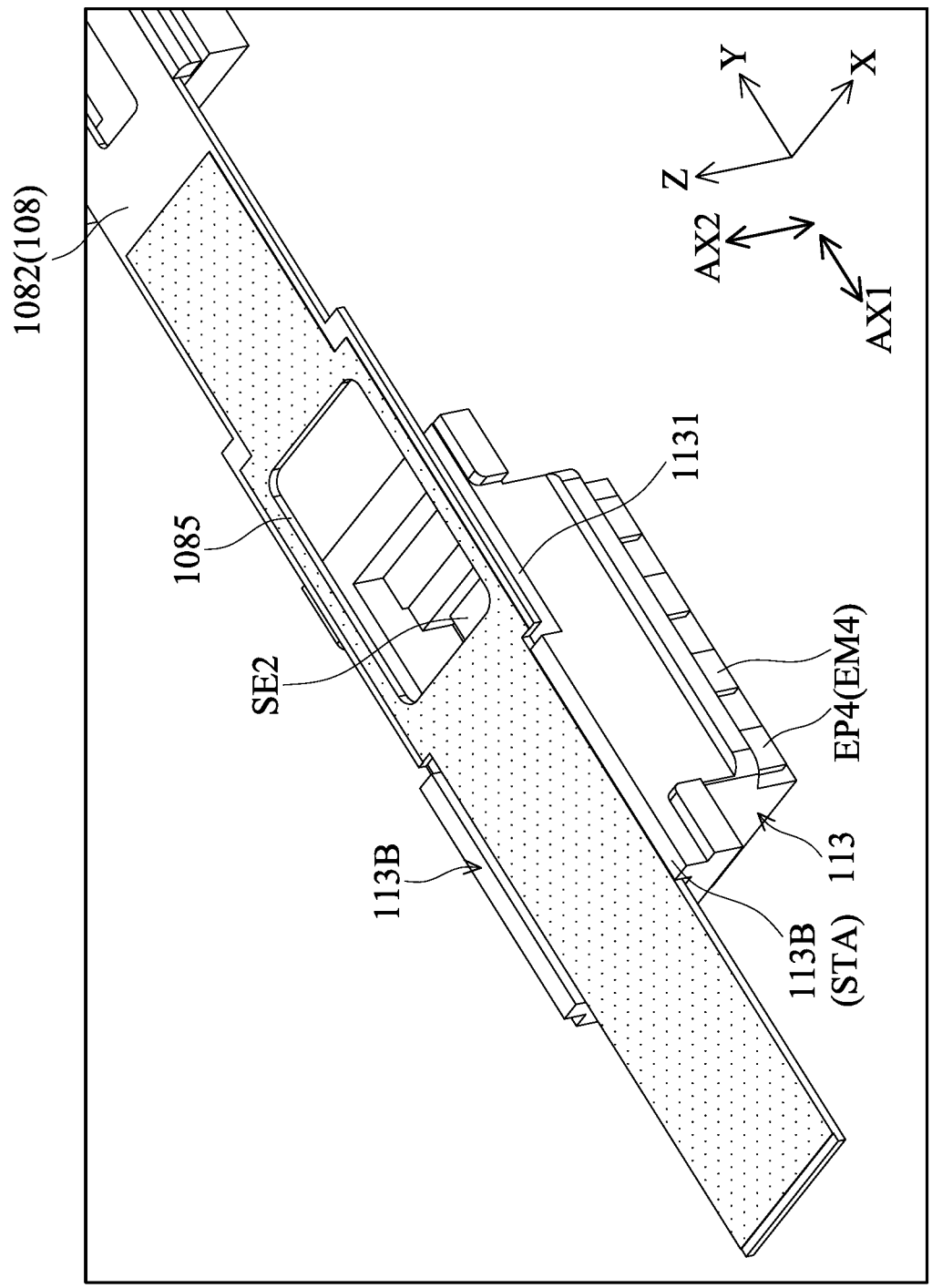
FIG. 12 is an enlarged view of a partial structure of the optical element driving mechanism 100 according to an embodiment of the present disclosure.

Please refer to FIG. 9, FIG. 10 and FIG. 12. FIG. 12 is an enlarged view of a partial structure of the optical element driving mechanism 100 according to an embodiment of the present disclosure. The optical element driving mechanism 100 further includes a stopping assembly STA configured to limit the range of motion of the first movable part 108 relative to the first base 112 and the second base 113.

The stopping assembly STA may include a first buffering element 160 disposed in a first rear groove 112RC of the first base 112. As shown in FIG. 9, when the first movable part 108 is in the first position, the holder 1081 of the first movable part 108 is in contact with the first buffering element 160.

The first buffering element 160 can be made of sponge, soft plastic, silicone, or a combination thereof. The first buffering element 160 can prevent damage caused by collision of the holder 1081 and the first base 112.

Similarly, the stopping assembly STA may further include a second buffering element 170 disposed in the accommodation space AS of the first base 112. As shown in FIG. 10, when the first movable part 108 is in the second position, the holder 1081 of the first movable part 108 is in contact with the second buffering element 170.

Similarly, the second buffering element 170 is made of sponge, soft plastic, silicone, or a combination thereof. As shown in FIG. 9 and FIG. 10, when viewed along the second axis AX2, the holder 1081 of the first movable part 108 is located between the second buffering element 170 and the first buffering element 160.

As shown in FIG. 10, when the first movable part 108 is located in the second position, a front end portion 1081F of the holder 1081 and a front side wall 113FS of the second base 113 form a first distance DS1 in the first axis AX1.

In addition, the front end portion 1081F of the holder 1081 and a front side surface MG31 of the sensed element MG3 form a second distance DS2 in the first axis AX1. The first distance DS1 is greater than the second distance DS2.

In addition, as shown in FIG. 12, the stopping assembly STA further includes two stopping structures 113B, which protrude from the top surface 1131 of the second base 113 along the second axis AX2. When the first movable part 108 is in the second position, the two stopping structures 113B are configured to stop the optical element 1082 of the first movable part 108.

Based on the above-mentioned structural configuration, when the first movable part 108 is located in the second position, the sensed element MG3 is not in contact with the front side wall 113FS of the second base 113. Therefore, the problem that the sensed element MG3 collides with the front side wall 113FS and is separated from the optical element 1082 can be avoided.

In addition, as shown in FIG. 9 and FIG. 10, the second base 113 further has a supporting portion 1133 configured to support the optical element 1082. The supporting portion 1133 may include a metal member 1135 embedded within the second base 113 and configured to contact the optical element 1082. Based on such a design, the problem of particles generated by the optical element 1082 due to friction can be avoided.

In this embodiment, the first base 112 and the second base 113 are made of different materials. For example, the first base 112 and the second base 113 are made of different plastic materials. Therefore, the first base 112 and the second base 113 have different Young's moduli.

For example, the Young's modulus of the second base 113 is less than the Young's modulus of the first base 112. That is, the second base 113 is made of a softer material, so when the optical element driving mechanism 100 is impacted, the second base 113 can effectively protect the first sensor SE1 and the second sensor SE2 from being damaged.

As shown in FIG. 9, the first base 112 has a first bottom surface 1120, and the second base 113 has a second bottom surface 1130. The first bottom surface 1120 and the second bottom surface 1130 are located on the same plane, for example, on the upper surface of the first supporting portion 15.

Furthermore, as shown in FIG. 9 and FIG. 10, the first optical module 150, the second base 113 and the second optical module 155 are arranged along the first axis AX1 in sequence. The first optical module 150 and the second optical module 155 correspond to the first opening 1021 and the second opening 1022, respectively.

When viewed along the second axis AX2, the first opening 1021 overlaps the first optical module 150, and the second opening 1022 overlaps the second optical module 155. The second base 113 is located between the first optical module 150 and the second optical module 155.

As shown in FIG. 9, when the first movable part 108 is located in the first position and when viewed along the second axis AX2, the third opening 1085 overlaps the first opening 1021, so that light can pass through the first opening 1021 and the third opening 1085 to enter the first optical module 150.

Furthermore, when the first movable part 108 is located in the first position and when viewed along the second axis AX2, the second opening 1022 does not overlap the optical element 1082, so that light can enter the second optical module 155 through the second opening 1022.

In this embodiment, when viewed along the second axis AX2, the second base 113 overlaps a portion of the first optical module 150. When viewed along the second axis AX2, the second base 113 overlaps a portion of the second optical module 155.

Based on such a design, the optical element driving mechanism 100 can have optical modules with a larger size and can achieve the purpose of miniaturization at the same time. In addition, the first driving assembly DA1 and the second driving assembly DA2 are also arranged along the first axis AX1.

Figure 13:
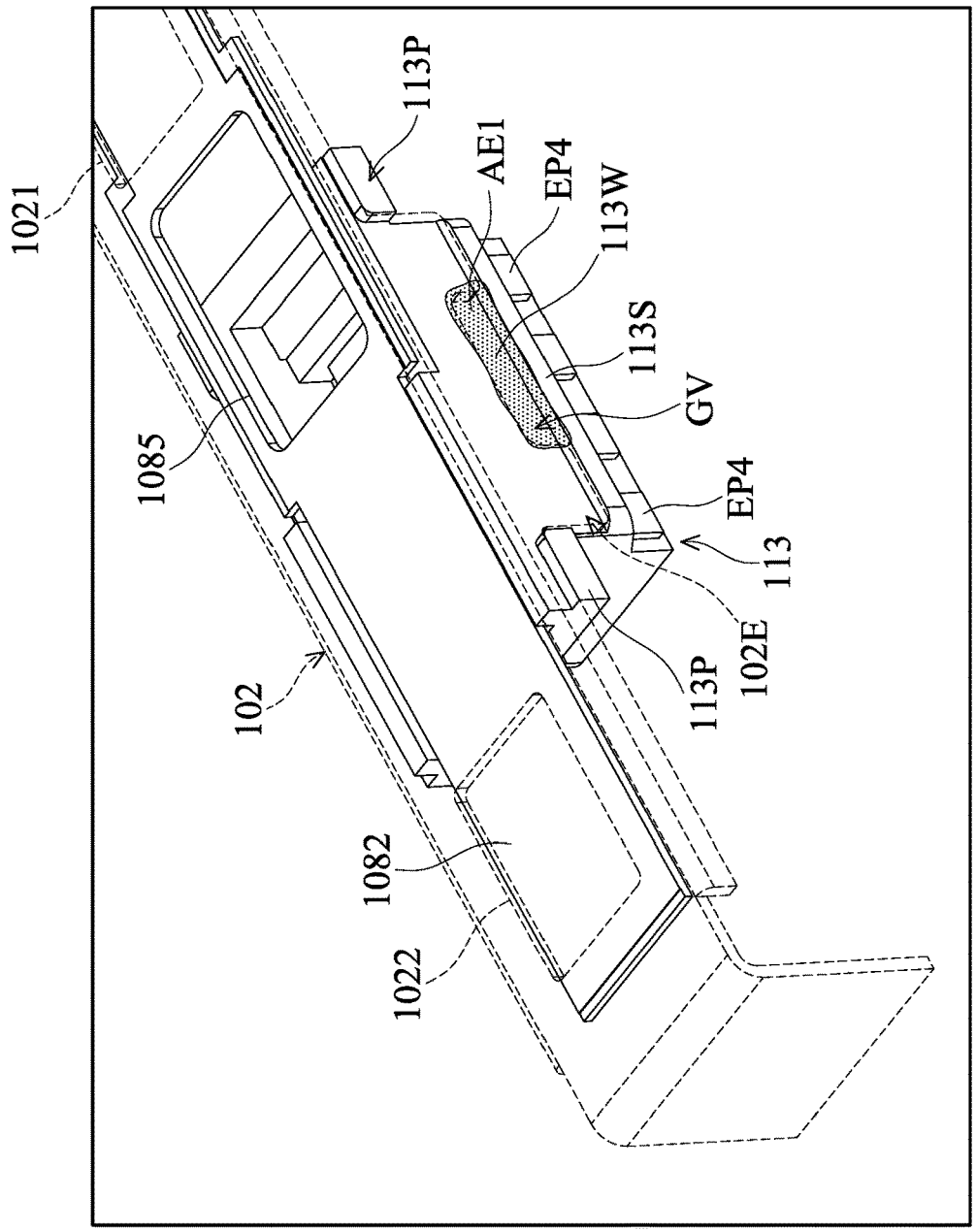
FIG. 13 is an enlarged view of a partial structure of the optical element driving mechanism 100 according to an embodiment of the present disclosure.

Next, please refer to FIG. 13, which is an enlarged view of a partial structure of the optical element driving mechanism 100 according to an embodiment of the present disclosure. The second base 113 has two positioning structures 113P, a supporting structure 113S and a side wall 113W. The two positioning structures 113P and the supporting structure 113S protrude from the side wall 113W along a third axis AX3. The third axis AX3 is perpendicular to the first axis AX1 and the second axis AX2.

The outer frame 102 has an engagement portion 102E having a U-shaped structure, and the engagement portion 102E is configured so that the outer frame 102 is connected to the second base 113. Specifically, the engagement portion 102E is fixed between the two positioning structures 113P, and the engagement portion 102E is in contact with the supporting structure 113S.

As shown in FIG. 13, the engagement portion 102E and the supporting structure 113S cooperatively form a glue trough GV configured to accommodate an adhesive element AE1. The adhesive element AE1 is, for example, glue, and is configured to adhere to the engagement portion 102E and the supporting structure 113S.

Based on such a design, the connection strength between the outer frame 102 and the second base 113 can be increased so as to avoid the problem that the outer frame 102 is separated from the second base 113 when the optical element driving mechanism 100 is impacted.

In summary, the present disclosure provides an optical element driving mechanism, including a first movable part, a fixed assembly, and a first driving assembly. The first movable part includes an optical element, and the first movable part is movable relative to the fixed assembly. The first driving assembly is configured to drive the first movable part to move relative to the fixed assembly. The optical element driving mechanism further includes at least one sensing assembly configured to sense the position of the first movable part relative to the fixed assembly.

In addition, the first base 112 and the second base 113 are arranged along the first axis AX1, and the outer frame 102 has a long strip-shaped structure extending along the first axis AX1. The outer frame 102 is fixedly connected to the first base 112 and the second base 113, and the second base 113 is configured to support the front end portion of the outer frame 102. Therefore, when the optical element driving mechanism 100 is subjected to an external force along the second axis AX2, the external force can be dispersed to the second base 113, thereby preventing the outer frame 102 from being crushed.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a first movable part, including an optical element;
a fixed assembly, wherein the first movable part is movable relative to the fixed assembly; and
a first driving assembly, configured to drive the first movable part to move relative to the fixed assembly;
wherein the fixed assembly includes a first base and a second base arranged along a first axis, and the first movable part moves along the first axis;
the first driving assembly is configured to drive the first movable part relative to the fixed assembly to move between a first position and a second position;
the fixed assembly further includes an outer frame, which is fixedly connected to the first base and the second base;
the outer frame has a first opening;
when the first movable part is located in the second position, the optical element shields the first opening.

2. The optical element driving mechanism as claimed in claim 1, wherein
the optical element driving mechanism further includes a first sensing assembly configured to sense a position of the first movable part relative to the fixed assembly;
the first sensing assembly includes a first sensor and a sensed element;
the second base has a receiving space, which is concaved from a top surface of the second base along a second axis;
the first sensor and the sensed element are accommodated in the receiving space;
the first sensor is fixedly disposed at the second base;
the sensed element is fixedly disposed on the optical element.

3. The optical element driving mechanism as claimed in claim 2, wherein
when the first movable part is located in the first position and when viewed along the second axis, the sensed element does not overlap the first sensor;
when the first movable part is located in the second position and when viewed along the second axis, the sensed element overlaps at least a portion of the first sensor;
when the first movable part is located in the second position, a projection of a center of the sensed element along the second axis is located on the first sensor.

4. The optical element driving mechanism as claimed in claim 3, wherein
the first sensor is configured to sense the sensed element to generate a first sensed value to an external circuit;
when the first movable part is located in the second position, the first sensing value exceeds a first threshold;
when the first sensing value exceeds the first threshold, the external circuit determines that the optical element shields the first opening according to the first sensing value.

5. The optical element driving mechanism as claimed in claim 4, wherein
the optical element driving mechanism further includes a second sensing assembly configured to sense the position of the first movable part relative to the fixed assembly;
the second sensing assembly includes a second sensor;
the second sensor is accommodated in the receiving space;
the second sensor is fixedly disposed at the second base;
when the first movable part is located in the first position and when viewed along the second axis, the sensed element overlaps the second sensor;
when the first movable part is located in the first position, the projection of the center of the sensed element along the second axis is located outside the second sensor;
when the first movable part is located in the second position and when viewed along the second axis, the sensed element does not overlap the second sensor.

6. The optical element driving mechanism as claimed in claim 5, wherein
the second sensor is configured to sense the sensed element to generate a second sensed value to the external circuit;
when the first movable part is located in the first position, the second sensing value exceeds a second threshold;

when the second sensing value exceeds the second threshold, the external circuit determines that the optical element does not shield the first opening according to the second sensing value;

the second threshold is lower than the first threshold.

7. The optical element driving mechanism as claimed in claim 6, wherein the optical element driving mechanism further includes a second driving assembly and a second movable part;

the second driving assembly is configured to drive the second movable part to rotate around the second axis, thereby locking the first movable part in the first position or the second position;

the first driving assembly includes a plurality of first electrical members configured to be electrically connected to the external circuit;

the first electrical members are fixedly disposed at the first base, and a portion of each first electrical member is buried in the first base;

the second driving assembly includes a plurality of second electrical members configured to be electrically connected to the external circuit;

the second electrical members are fixedly disposed at the first base, and a portion of each second electrical member is buried in the first base.

8. The optical element driving mechanism as claimed in claim 7, wherein the first sensing assembly further includes a plurality of third electrical members configured so that the first sensor is electrically connected to the external circuit;

the third electrical members are fixedly disposed at the second base, and a portion of each third electrical member is buried in the second base;

the second sensing assembly further includes a plurality of fourth electrical members configured so that the second sensor is electrically connected to the external circuit;

the fourth electrical members are fixedly disposed at the second base, and a portion of each fourth electrical member is buried in the second base.

9. The optical element driving mechanism as claimed in claim 8, wherein each first electrical member has a first electrical connecting portion exposed from the first base;

each second electrical member has a second electrical connecting portion exposed from the first base;

each third electrical member has a third electrical connecting portion exposed from the second base;

each fourth electrical member has a fourth electrical connecting portion exposed from the second base;

the third electrical connecting portions and the fourth electrical connecting portions are located on opposite sides of the second base;

the first electrical connecting portions, the second electrical connecting portions and the third electrical connecting portions are located on a first side of the optical element driving mechanism.

10. The optical element driving mechanism as claimed in claim 9, wherein the optical element driving mechanism further includes a stopping assembly configured to limit range of motion of the first movable part relative to the first base;

the stopping assembly includes a first buffering element disposed in a first rear groove of the first base;

when the first movable part is located in the first position, a holder of the first movable part is in contact with the first buffering element;

the first buffering element is made of sponge, soft plastic, silicone, or a combination thereof.

11. The optical element driving mechanism as claimed in claim 10, wherein the stopping assembly further includes a second buffering element, disposed in an accommodation space of the first base;

when the first movable part is located in the second position, the holder of the first movable part is in contact with the second buffering element;

the second buffering element is made of sponge, soft plastic, silicone, or a combination thereof;

when viewed along the second axis, the holder of the first movable part is located between the second buffering element and the first buffering element.

12. The optical element driving mechanism as claimed in claim 11, wherein when the first movable part is located in the second position, a front end portion of the holder and a front side wall of the second base form a first distance in the first axis;

the front end portion of the holder and a front side surface of the sensed element form a second distance in the first axis;

the first distance is longer than the second distance.

13. The optical element driving mechanism as claimed in claim 12, wherein the stopping assembly further includes two stopping structures, which protrude from the top surface of the second base along the second axis;

when the first movable part is located in the second position, the two stopping structures are configured to stop the first movable part;

when the first movable part is in the second position, the sensed element is not in contact with the front side wall of the second base.

14. The optical element driving mechanism as claimed in claim 13, wherein the first base and the second base are made of different materials;

the first base and the second base have different Young's moduli;

the Young's modulus of the second base is less than the Young's modulus of the first base;

the first base has a first bottom surface, and the second base has a second bottom surface;

the first bottom surface and the second bottom surface are on a same plane.

15. The optical element driving mechanism as claimed in claim 14, wherein the second base has two positioning structures, a supporting structure and a side wall;

the two positioning structures and the supporting structure protrude from the side wall along a third axis;

the third axis is perpendicular to the first axis and the second axis.

16. The optical element driving mechanism as claimed in claim 15, wherein the outer frame has an engagement portion configured so that the outer frame is connected to the second base;

the engagement portion is fixed between the two positioning structures;

the engagement portion is in contact with the supporting structure;

the engagement portion and the supporting structure cooperatively form a glue trough configured to accommodate an adhesive element;

the adhesive element is configured to adhere to the engagement portion and the supporting structure.

17. The optical element driving mechanism as claimed in claim 16, wherein
- the outer frame further includes a second opening, and the second opening and the first opening are arranged along the first axis;
- a third opening corresponding to the first opening is formed on the optical element;
- when the first movable part is in the first position and when viewed along the second axis, the third opening overlaps the first opening;
- when the first movable part is located in the first position and when viewed along the second axis, the second opening does not overlap the optical element;
- the second base further has a supporting portion configured to support the optical element;
- the supporting portion includes a metal member configured to be in contact with the optical element.

18. The optical element driving mechanism as claimed in claim 17, wherein
- the optical element driving mechanism further includes a first optical module and a second optical module;
- the first optical module, the second base and the second optical module are arranged along the first axis in sequence;
- the first optical module and the second optical module correspond to the first opening and the second opening respectively.

19. The optical element driving mechanism as claimed in claim 18, wherein
- when viewed along the second axis, the first opening overlaps the first optical module, and the second opening overlaps the second optical module;
- the second base is located between the first optical module and the second optical module;
- when viewed along the second axis, the second base overlaps a portion of the first optical module;
- when viewed along the second axis, the second base overlaps a portion of the second optical module;
- the first driving assembly and the second driving assembly are arranged along the first axis.

\* \* \* \* \*